(12) United States Patent
Kim et al.

(10) Patent No.: US 8,000,579 B2
(45) Date of Patent: Aug. 16, 2011

(54) RECORDING MEDIUM, METHOD AND APPARATUS FOR PROVIDING MANAGEMENT INFORMATION

(75) Inventors: Byungjin Kim, Kyunggi-do (KR); Kang-soo Seo, Kyunggi-do (KR); Jea-Yong Yoo, Seoul (KR); Ki Won Kang, Seoul (KR)

(73) Assignee: LG Electronics Inc., Seoul (KR)

( * ) Notice: Subject to any disclaimer, the term of this patent is extended or adjusted under 35 U.S.C. 154(b) by 1340 days.

(21) Appl. No.: 11/482,806

(22) Filed: Jul. 10, 2006

(65) Prior Publication Data

US 2006/0251392 A1 Nov. 9, 2006

Related U.S. Application Data

(63) Continuation of application No. 10/651,036, filed on Aug. 29, 2003, now Pat. No. 7,313,314, which is a continuation of application No. 10/232,706, filed on Sep. 3, 2002, now Pat. No. 6,925,247, which is a continuation of application No. 09/435,608, filed on Nov. 8, 1999, now Pat. No. 6,470,135.

(30) Foreign Application Priority Data

Nov. 8, 1998 (KR) ..................................... 98-48096

(51) Int. Cl.
*H04N 9/80* (2006.01)
(52) U.S. Cl. ..................................................... 386/241
(58) Field of Classification Search ............... 386/1, 46, 386/68–70, 95, 109, 124–126
See application file for complete search history.

(56) References Cited

U.S. PATENT DOCUMENTS

| 5,455,684 | A | 10/1995 | Fujinami et al. |
| 5,535,008 | A | 7/1996 | Yamagishi et al. |
| 5,621,840 | A | 4/1997 | Kawamura et al. |
| 5,740,307 | A | 4/1998 | Lane |
| 5,832,085 | A | 11/1998 | Inoue et al. |
| 5,859,949 | A | 1/1999 | Yanagihara |
| 5,870,523 | A | 2/1999 | Kikuchi et al. |
| 5,991,502 | A | 11/1999 | Kawakami et al. |
| 6,002,834 | A | 12/1999 | Hirabayashi et al. |
| 6,016,382 | A | 1/2000 | Yamagishi et al. |
| 6,028,726 | A | 2/2000 | Yanagihara |
| 6,061,382 | A | 5/2000 | Govorkov et al. |
| 6,065,050 | A | 5/2000 | DeMoney |
| 6,078,727 | A * | 6/2000 | Saeki et al. .................. 386/125 |
| 6,115,531 | A | 9/2000 | Yanagihara |
| 6,229,801 | B1 | 5/2001 | Anderson et al. |

(Continued)

FOREIGN PATENT DOCUMENTS

JP 7212768 8/1995

(Continued)

*Primary Examiner* — Peter-Anthony Pappas
*Assistant Examiner* — Heather R Jones
(74) *Attorney, Agent, or Firm* — Birch, Stewart, Kolasch & Birch, LLP

(57) ABSTRACT

According to an embodiment, a method of recording a digital stream on a recording medium, includes determining one of at least two recording modes to record a transmitted digital stream, wherein a first recording mode is to record data based on entry point information present in the digital stream and a second recording mode is to record data on a basis of a predetermined time; and recording the digital stream based on the determined recording mode, and recording a mode information indicating the determined recording mode.

24 Claims, 6 Drawing Sheets

U.S. PATENT DOCUMENTS 6,282,320 B1  8/2001  Hasegawa et al.
6,466,733 B1  10/2002 Kim
6,470,135 B1  10/2002 Kim et al.
6,925,247 B2  8/2005  Kim et al.

FOREIGN PATENT DOCUMENTS

JP  8163496   6/1996
JP  9322111   12/1997
JP  10243352  9/1998

* cited by examiner

*Conventional Art*

RECORDING MEDIUM, METHOD AND
APPARATUS FOR PROVIDING
MANAGEMENT INFORMATION

CROSS-REFERENCE

This present application is a continuation of U.S. patent application Ser. No. 10/651,036 filed on Aug. 29, 2003 now U.S. Pat. No. 7,313,314, which is a continuation of U.S. patent application Ser. No. 10/232,706, filed on Sep. 3, 2002, now issued as U.S. Pat. No. 6,925,247B2 on Aug. 2, 2005, for which priority is claimed under 35 U.S.C. §120, which is a continuation of U.S. patent application Ser. No. 09/435,608, filed on Nov. 8, 1999, now issued as U.S. Pat. No. 6,470,135 on Oct. 22, 2002; and this present application claims priority of Patent Application No. 98-48096, filed in Korea on Nov. 8, 1998, under 35 U.S.C. §119. The entire contents of each of these applications are herein fully incorporated by reference.

BACKGROUND OF THE INVENTION

1. Field of the Invention

The present invention relates to a method and apparatus for recording received digital data streams on a recording medium and creating and recording management information pertaining to the recorded digital data streams.

2. Description of the Related Art

In conventional analog television broadcast systems, video signals are transmitted over the air or through cables after being AM or FM modulated. With the recent advance of digital technologies such as digital image compression or digital modulation/demodulation, standardization for digital television broadcast is in rapid progress. Based upon the Moving Picture Experts Group (MPEG) format, satellite and cable broadcast industry also moves towards digital broadcast.

Digital broadcast offers several advantages that its analog counterpart cannot provide. For example, digital broadcast is capable of providing services with far more improved video/audio quality, transmitting several different programs within a fixed bandwidth, and offering enhanced compatibility with digital communication media or digital storage media.

In digital broadcast, a plurality of programs encoded based upon the MPEG format are multiplexed into a transport stream which is then transmitted. The transmitted transport stream is received by a set top box at the receiver and demultiplexed into a plurality of programs. If a program is chosen from the demultiplexed programs, the chosen program is decoded by a decoder in the set top box and original audio and video signals are retrieved. The retrieved audio and video signals can be presented by an A/V output apparatus such as a TV.

It is also possible to record the received digital broadcast signals on a storage medium instead of directly outputting the received broadcast signals to A/V output devices. The stored digital broadcast signals can be edited and retrieved afterwards. For example, a digital data stream received by a set top box can be stored in a streamer such as a digital video disk (DVD) recording apparatus after being transmitted through communication interfaces like an IEEE-1394 serial bus. Later, the stored digital data stream can be edited and transmitted back to the set top box so that the stored original digital audio and video data can be presented.

For the above-mentioned systems, it is necessary to develop a method for recording a received digital data stream on a recording medium by partitioning the received data stream into minimum presentation units, each minimum presentation unit being a data decoding unit. Unless the recorded data stream maps to random-accessible minimum presentation units, the initial reproduction of the recorded stream after search operations may be imperfect.

SUMMARY OF THE INVENTION

Accordingly, it is an object of the present invention to provide a recording medium, method and apparatus for providing management information pertaining to recorded digital data streams.

A method for providing management information in accordance with an embodiment of the present invention includes grouping data of a digital data stream into a plurality of object units, and creating map information for accessing the data, wherein the map information includes time information and object unit information associated with the object units.

A recording medium for providing management information in accordance with an embodiment of the present invention includes a plurality of object units stored on the recording medium, the object units representing groups of data of a digital data stream, and map information stored on the recording medium for accessing the data, wherein the map information includes time information and object unit information associated with the object units.

An apparatus for providing management information according to an embodiment of the invention, includes elements for grouping data of a digital data stream into a plurality of object units and for creating map information for accessing the data, wherein the map information includes access time information and object unit information associated with the object units.

According to another aspect of the present invention, there is provided a method of recording a digital stream on a recording medium, comprising: determining one of at least two recording modes to record a transmitted digital stream, wherein a first recording mode is to record data based on entry point information present in the digital stream and a second recording mode is to record data on a basis of a predetermined time; and recording the digital stream based on the determined recording mode, and recording a mode information indicating the determined recording mode.

According to another aspect of the present invention, there is provided a method of recording a digital stream on a recording medium, comprising: selecting one of at least two recording modes to record a received digital stream, wherein a first recording mode is to record data based on an entry point information present in the digital stream and a second recording mode is to record data on a basis of a predetermined time; and recording the digital stream based on the determined recording mode, and recording a mode information indicating the selected recording mode.

According to another aspect of the present invention, there is provided a method of recording a digital stream on a recording medium, the method comprising: determining whether to record the digital stream comprising a plurality of data packets according to a first recording mode or second recording mode, wherein the first recording mode is to record data packets based on an entry point information present in the digital stream and the second recording mode is to record the data packets received within a predetermined time; and recording the data packets according to the determined recording mode, and recording a mode information indicating the determined recording mode.

According to another aspect of the present invention, there is provided an apparatus for recording a digital stream on a recording medium, the apparatus comprising: a controller determining whether to record the digital stream comprising a plurality of data packets according to a first recording mode or second recording mode, wherein the first recording mode is to record the data packets based on an entry point information present in the digital stream and the second recording mode is to record the data packets received within a predetermined time; and a recording unit, coupled to the controller, recording the data packets based on one of the first and second recording modes according to a control of the controller, and recording a mode information indicating the determined recording mode at a specific area of the recording medium.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention, illustrate the preferred embodiments of the invention, and together with the description, serve to explain the principles of the present invention.

In the drawings.

DETAILED DESCRIPTION OF THE PREFERRED EMBODIMENTS

In order that the invention may be fully understood, preferred embodiments thereof will now be described with reference to the accompanying drawings.

Figure 1:
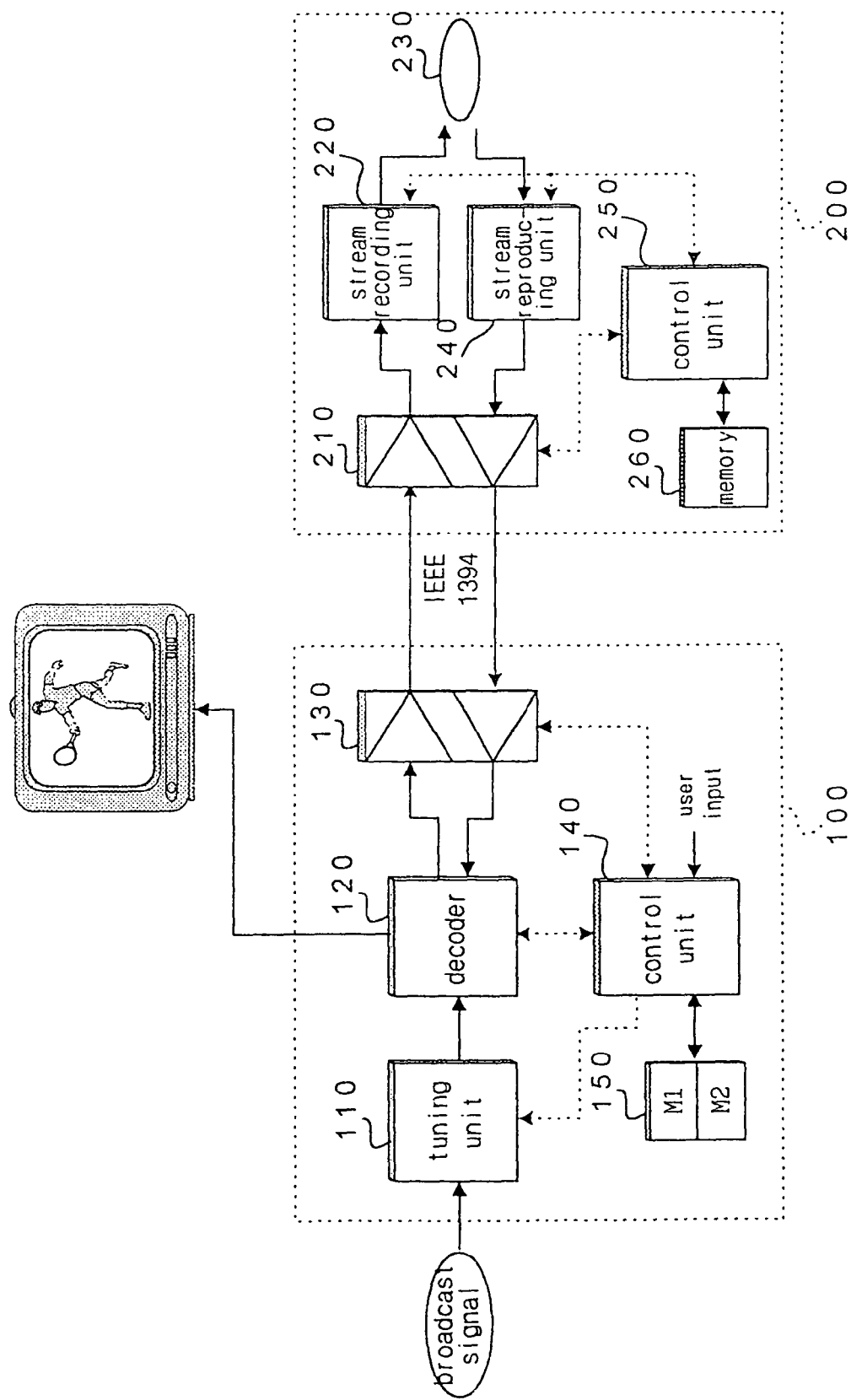
FIG. 1 is a block diagram of an apparatus in which the present invention may be advantageously practiced.

FIG. 1 depicts a block diagram of an apparatus in which the present invention may be practiced according to an embodiment of the invention. The apparatus includes a set top box 100, a communication interface (e.g., IEEE-1394), and a streamer 200, all operatively coupled.

The set top box 100 receives transport streams encoded by system encoders and transmitted by a plurality of broadcast stations and demultiplexes the received transport streams. After a system decoder 120 decodes the transport stream of a program tuned by a tuning unit 110, a control unit 140 outputs the decoded transport stream to an A/V output device such as a TV set for presentation.

The set top box 100 may transmit a program chosen by a user to the streamer 200 through an interface such as the IEEE-1394 interface so that the transmitted program is recorded on a recording medium 230 such as a digital video disk by the streamer 200.

In addition, as requested by a user, the set top box 100 may receive a program retrieved from the recording medium 230 by the streamer 200 through the IEEE-1394 communication interface so that the received program can be presented on a TV set after being decoded by the decoder 120.

Figure 2:
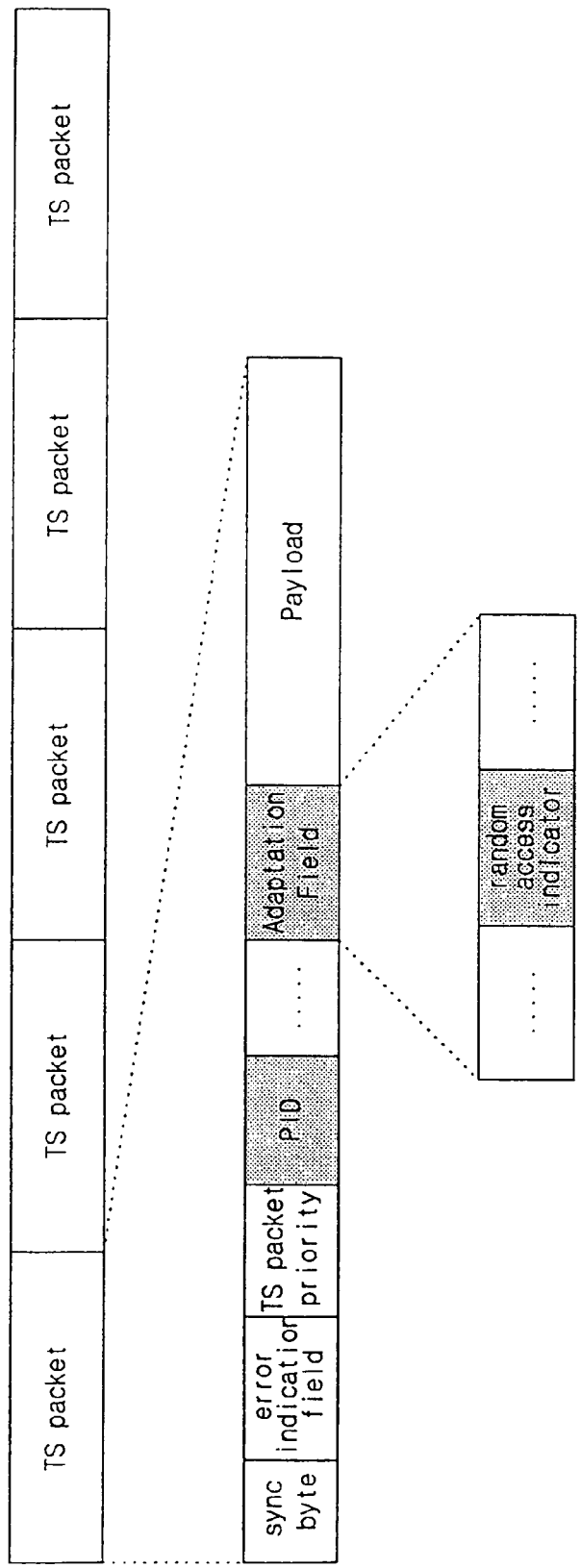
FIG. 2 is a pictorial representation showing the syntax of a digital data stream.

A transport stream packet of a program stream, as shown in, e.g., FIG. 2, includes a packet header and a payload, the packet header containing fields of a 8-bit sync byte, an error indication field indicative of a possible error of the packet, a PID showing attributes of the data contained in the payload, and an adaptation field. The adaptation field contains various information on the properties of the data stream, such as a random access indicator indicating the start of a video sequence header which is a random access entry point.

Figure 3:
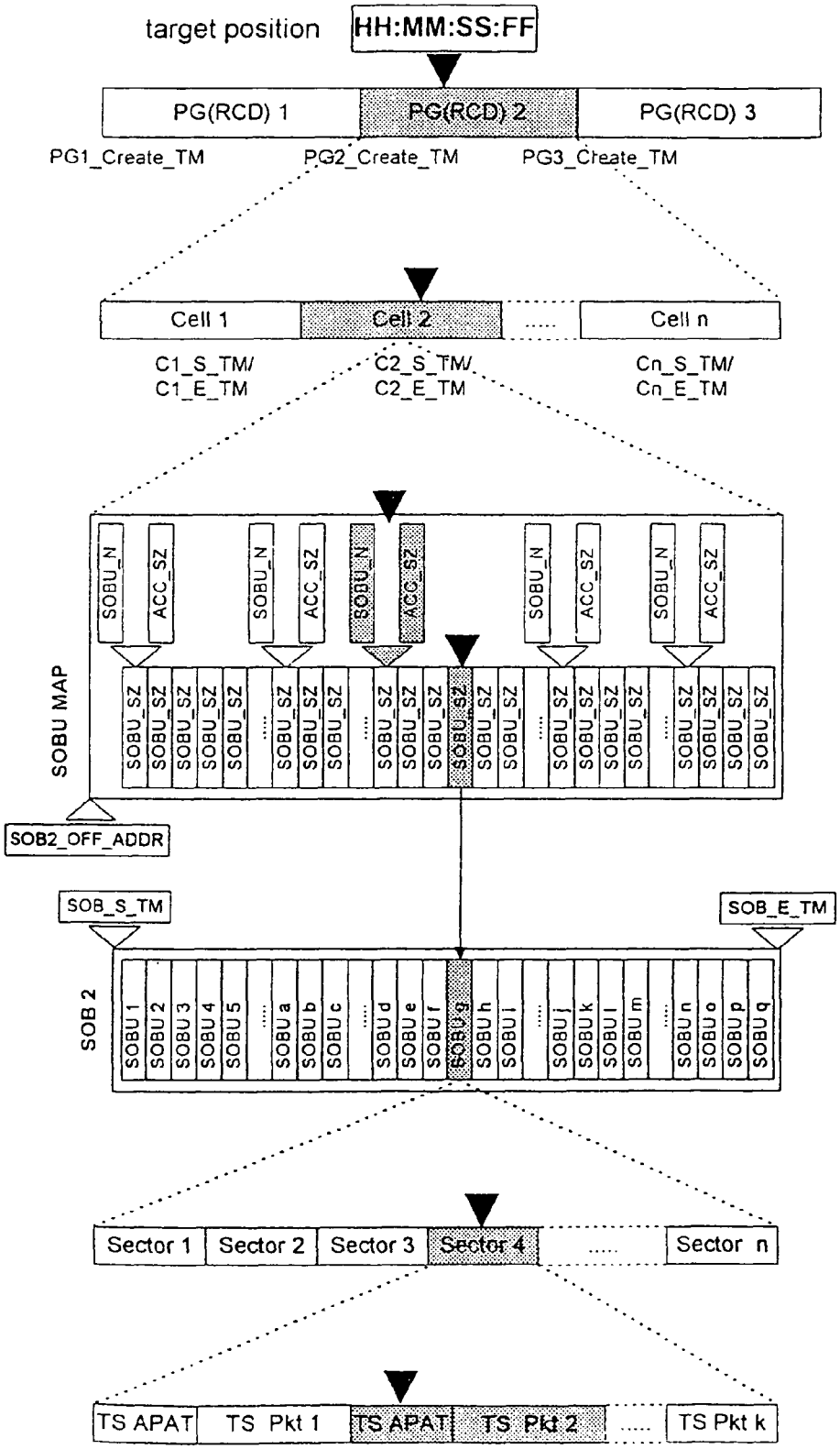
FIG. 3 is a pictorial representation showing the syntax of the recorded data and the management information pertaining to the recorded data created by an embodiment of the present invention.

The method for recording digital data streams in accordance with an embodiment of the present invention will now be described with reference to FIGS. 1 and 3.

If a user's request for recording an incoming data stream tuned by the tuning unit 110 has been received, the control unit 140 of the set top box 100 informs a control unit 250 of the streamer 200 that a recording mode is set and begins to transfer the received digital stream to the streamer 200 through the interface such as the IEEE-1394 interface. The control unit 250 of the streamer 200 controls a stream recording unit 220 to record the received data stream on the recording medium 230. The transport stream packets (TS Pkt 1~TS Pkt k) constituting the data stream are recorded on the recording medium 230 along with respective transport stream packet arrival times (TS APATS), wherein the transport stream packets with packet arrival times are organized in sectors on the recording medium 230.

Concurrently, the control unit 250 of the streamer 200 detects the random access indicator contained in a transport stream packet header. If a random access indicator is detected, previously received transport stream packets and the transport stream packet having the random access indicator are grouped into a stream object unit (SOBU). Likewise, transport stream packets received after the transport stream packet having the random access indicator and a transport stream packet having the next random access indicator are grouped into another stream object unit (SOBU). In this manner, the received data stream is recorded on the recording medium as a series of stream object units (SOBU 1~SOBU q) as shown in FIG. 3. A stream object unit presentation time (SOBU_TM) and a stream object unit size (SOBU_SZ) are created for each stream object unit (SOBU) and recorded as management information pertaining to the associated stream object unit, where the stream object unit size (SOBU_SZ) is expressed in terms of the number of sectors in which the associated stream object unit (SOBU) is recorded. As shown in FIG. 3, the specific location of a desired SOBU (e.g., SOBU g) can be identified using the stream object unit size (SOBU_SZ), such that the SOBU_SZ can be considered location information.

If a predetermined number, for example 20, of stream object units (SOBUs) are created by repeating the grouping task, the control unit 250 creates and records a stream object unit index number (SOBU_N), an accumulated presentation time (ACC_TM), and an accumulated size (ACC_SZ) for the 20 stream object units. The accumulated presentation time (ACC_TM) and accumulated size (ACC_SZ) for each of 20 stream object units are the presentation time and size accumulated from the start position (SOB2_OFF_ADDR) of the stream object (SOB2) containing the associated stream object units to each of 20 stream object units, respectively. In this aspect, ACC_SZ can be considered location information.

After the recording mode ends, the control unit 250 of the streamer 200 groups the created stream object units (SOBUs) into a stream object (SOB) and groups the recorded accumulated sizes (ACC_SZs) and stream object unit sizes (SOBU_SZs) into a map. The map is stored in the management information area of a memory 260 as stream object information (SOBI).

Subsequently, the control unit 250 of the streamer 200 creates a presentation sequence information (Cell) concerning the map and stores the cell as the presentation sequence information corresponding to the created record (RCD) or program (PG) in the management information area of the memory 260.

The method for a time search operation by a user will now be explained by assuming that digital data streams are recorded on the recording medium by the aforementioned method.

If a user enters a search time (HH:MM:SS:FF) in order to search for a specific position on the recording medium 230, the control unit 250 of the streamer 200 looks for a record (RCD) or program (PG) corresponding to the user's search time (HH:MM:SS:FF) with reference to the creation times (PG1_Create_TM, PG2_Create_TM, PG3_Create_TM) of records (RCD1~RCD3) or programs (PG1~PG3). Suppose the detected program is PG2 shown in FIG. 3. Then, the control unit 250 looks for a Cell (Cell 2 shown in FIG. 3) corresponding to the user's search time (HH:MM:SS:FF) with reference to the presentation start time (C1_S_TM, C2_S_TM, . . . , Cn_S_TM) and presentation end time (C1_E_TM, C2_E_TM, . . . , Cn_E_TM) of each Cell contained in the detected program PG2.

Referring to the stream object information (SOBI) of the stream object SOB2 associated with the detected presentation sequence information Cell 2, the control unit 250 detects a target accumulated entry (ACC Entry, the entry shaded in FIG. 3) containing the accumulated presentation time (ACC_TM) which is closest to the difference between the user's search time (HH:MM:SS:FF) and the stream object start time (SOB_S_TM). Lastly, the control unit 250 detects a stream object unit (SOBU) corresponding to the stream object unit presentation time (SOBU_TM) of the stream object unit containing the user's search time (HH:MM:SS:FF) by accumulating stream object unit presentation times (SOBU_TMs) from the stream object unit pointed to by the detected accumulated entry (ACC Entry). The target stream object unit (SOBU) can be located by adding the accumulated size (ACC_SZ) of the target accumulated entry (ACC Entry) to the sum of stream object sizes (SOBU_SZs) calculated from the stream object unit pointed to by the target accumulated entry (ACC Entry).

The control unit 250 controls a stream reproducing unit 240 to reproduce transport stream packets from the first sector (Sector 1) in which the detected target stream object unit (SOBUg shown in FIG. 3) is recorded and transmit the reproduced transport stream packets to the set top box 100 through the IEEE-1394 interface. The decoding operation, therefore, is performed from the transport stream packet having a random access indicator, which means video data is reproduced from the Intra-picture and audio data is reproduced from the first bye of a frame.

Figure 4A:
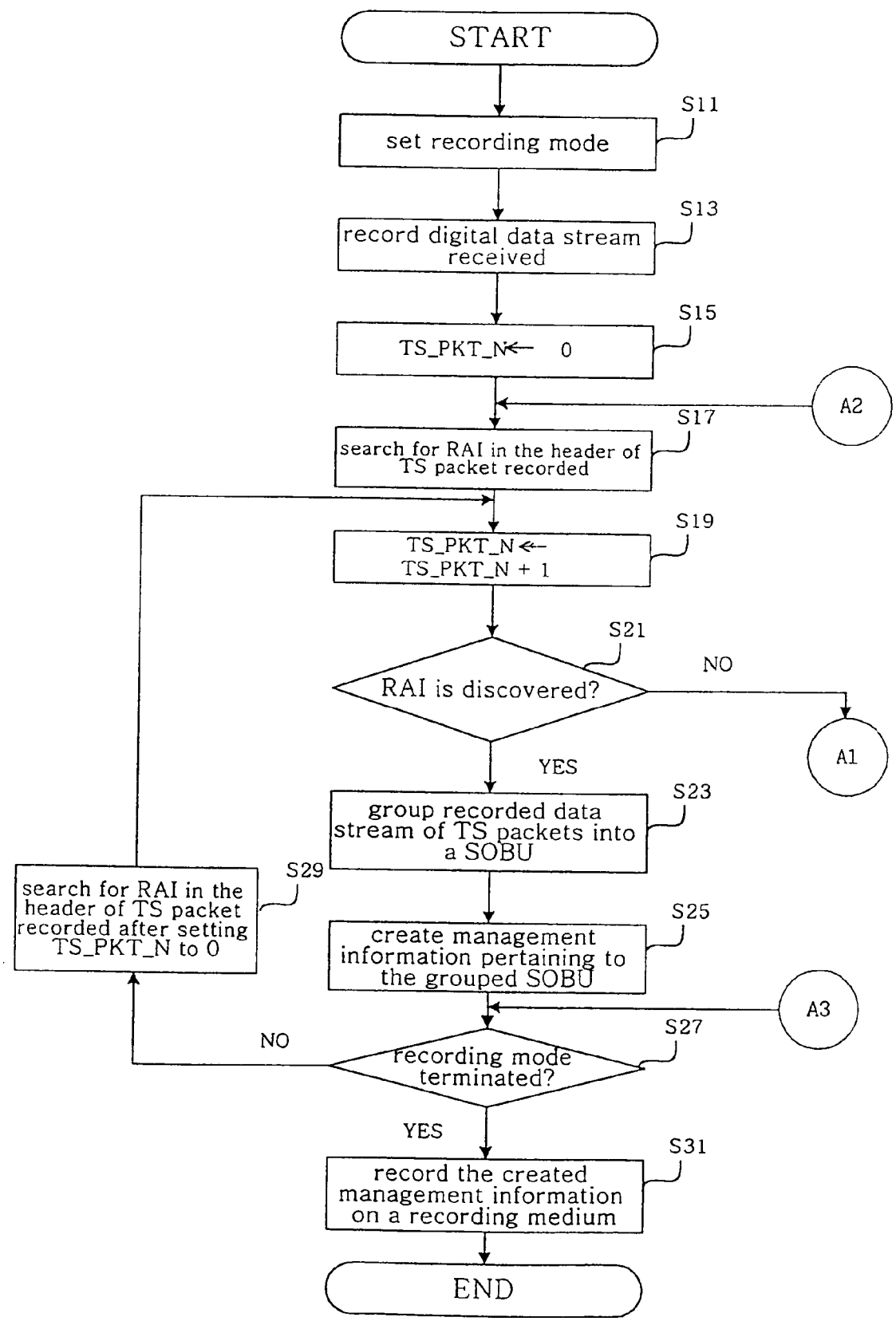
FIGS. 4A and 4B are flow diagrams of the method for recording digital data streams according to an embodiment of the present invention.
Figure 4B:
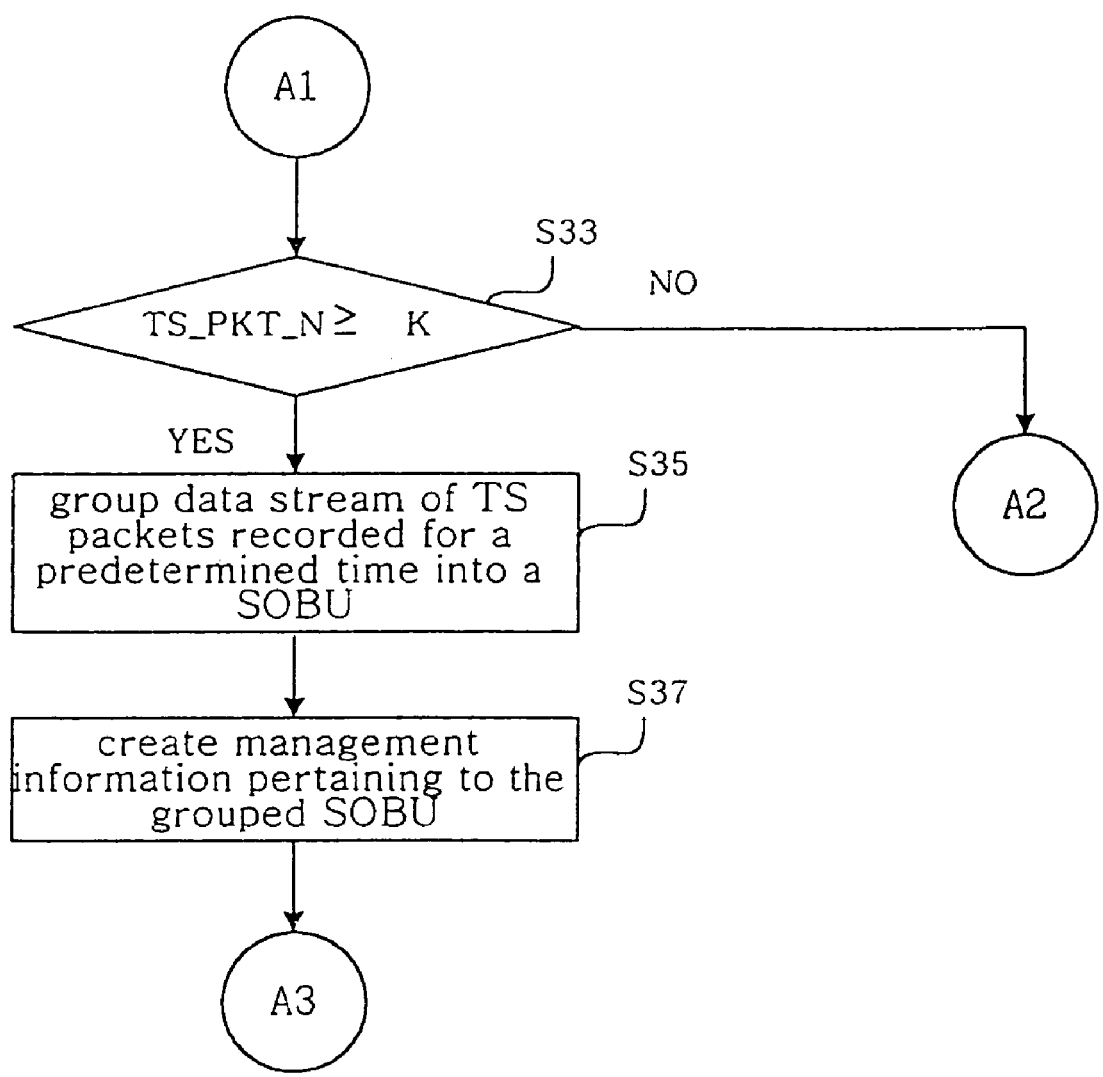

The method for recording digital data streams in accordance with an embodiment of the present invention will be described with reference to the flow diagrams shown in FIGS. 4A and 4B.

If a user's request for recording an incoming data stream tuned by the tuning unit 110 has been received, the control unit 140 of the set top box 100 informs the control unit 250 of the streamer 200 that a recording mode is set and begins to transfer the received digital stream to the streamer 200 through the IEEE-1394 interface (S11).

The control unit 250 of the streamer 200 controls the stream recording unit 220 to record the data stream received through the IEEE-1394 interface on the recording medium 230 (S13). The transport stream packets (TS Pkt 1~TS Pkt k) constituting the data stream are recorded on the recording medium 230 along with respective transport stream packet arrival times (TS APATs), wherein the transport stream packets with packet arrival times are organized in sectors on the recording medium 230.

Subsequently, the control unit 250 resets an internal register for storing the number of transport stream packets (TS_Pkt_N) to zero (S15) and searches for a random access indicator (RAI) in the header of the first transport stream packet of the input data stream (S17). And the control unit 250 increments the internal register value indicative of the number of transport stream packets (TS_Pkt_N) by 1 (S19) and checks if a random access indicator has been discovered in step S17 (S21).

In the instance where the existence of a random access indicator is confirmed in step S21, the transport stream packets received up to the transport stream packet having the random access indicator are grouped into a stream object unit (SOBU) as discussed above (S23). Likewise, transport stream packets received after the transport stream packet having the random access indicator and the transport stream packet having the next random access indicator are grouped into another stream object unit (SOBU).

If a stream object unit is created, the control unit 250 creates a stream object unit presentation time (SOBU_TM) and a stream object unit size (SOBU_SZ) for the stream object unit (SOBU) and stores such map information in the management information area of the memory 260 as management information regarding the stream object unit (SOBU).

The control unit 250 checks whether a request for terminating the recording mode has been received (S27) during the recording mode. If it is not received, the control unit 250 continues to search for a random access indicator in the input data stream and initializes the number of transport stream packets (TS_Pkt_N) (S29). And the flow returns to step S19.

If the terminating command is received, the control unit 250 reads the management information stored in the management information area of the memory 260 and records the management information in the management information area of the recording medium 230 before terminating the recording mode (S31).

After the recording mode ends, the control unit 250 of the streamer 200 groups the created stream object units (SOBUs) into a stream object (SOB), and groups the recorded accumulated sizes (ACC_SZs), which have been generated during the recording mode as in the aforementioned embodiment, and stream object unit sizes (SOBU_SZs) into a map. The map is stored in the management information area of the memory 260 as stream object information (SOBI). In addition, the control unit 250 also creates presentation sequence information for the grouped stream object and records it as cell information for the stream object.

Additionally, the control unit 250 sets the value of a stream object unit grouping type indication flag contained in the stream object information (SOBI) to 1 for indicating that stream object units constituting the stream object are created based upon the random access indicator.

The value of the stream object unit grouping type indication flag implies that the stream object unit (SOBU) is created so that it is randomly accessible and thus the stream object unit (SOBU) is the basic group for a trick-play which means data-discrete reproduction. This fact also means that the stream object unit (SOBU) contains a random access entry point.

Stream object units can be created in many different ways. For example, it is possible to generate stream object units of a predetermined size without regard to the random access indicator. If a random access indicator is detected from a stream object unit, a flag indicative of the fact can be set to 1 for the stream object unit (SOBU) and recorded on the recording medium.

To be more specific, an n-bit data is created for a stream object including n stream object units (SOBU1~SOBUn) and each bit of the data is associated with each stream object unit. Then, it can be examined whether a stream object unit (SOBU) has a random access indicator by simply checking the associated bit value.

In the meantime, if it is verified that a random access indicator is not discovered in step S21, the control unit 250 checks if the number of transport stream packets (TS_P-KT_N) stored in the internal register is greater than a predetermined value K (S33). If not, the flow returns to step S17 and continues the aforementioned procedure.

The value K is determined in consideration of the minimum transfer rate of a data stream. For example, suppose that the desirable minimum time length of a stream object unit (SOBU) is 0.5 s (seconds) and the minimum transfer rate of an input data stream is 3 Mbps. In this case, the size of data received for 0.5 s exceeds 1875000 bytes and more than 997 transport stream packets are received for 0.5 s with each transport stream packet having 188 bytes. Considering the number of transport stream packets received for 0.5 s, it is desirable to set the value K greater than 997. It is because at least one packet among 997 transport stream packets should have a random access indicator if the data stream is supposed to contain random access indicators.

If the number of transport stream packets (TS_PKT_N) stored in the internal register is greater than the predetermined value K in step S33, the control unit 250 decides that random access indicators were not inserted into the data stream when the data stream was transmitted by the associated broadcast station. The flow continues to step S35.

With reference to time information contained in the transport stream packets, the control unit 250 records the received transport stream packets by grouping them into stream object units, with each stream object unit (SOBU) having a fixed time length, for example, 0.5 s (S35). Also, the control unit 250 creates a stream object unit size (SOBU_SZ) and a stream object unit presentation time (SOBU_TM) for each stream object unit (SOBU) and records the created information as management information for the associated stream object unit (SOBU) (S37). The stream object unit size (SOBU_SZ) of a stream object unit (SOBU) is expressed in terms of the number of sectors containing the stream object unit. If 20 stream object units (SOBUs) are created after 10 s elapses, the control unit 250 creates and records a stream object unit index number (SOBU_N), an accumulated presentation time (ACC_TM), and an accumulated size (ACC_SZ) for each stream object unit (SOBU). The accumulated presentation time (ACC_TM) and accumulated size (ACC_SZ) of a stream object unit are the presentation time and size accumulated from the start position (SOB2_OFF_ADDR) of the stream object (SOB2) containing the stream object unit to the stream object unit, respectively.

After the recording mode ends, the control unit 250 groups the created stream object units (SOBUs) into a stream object (SOB) and groups the recorded accumulated sizes (ACC_SZs) and stream object unit sizes (SOBU_SZs) into a map. The map is stored in the management information area of the memory 260 as stream object information (SOBI).

At this time, the control unit 250 sets the stream object unit grouping type indication flag contained in the stream object information (SOBI) to zero to inform that stream object units (SOBUs) constituting the stream object (SOB) have not been generated based upon random access indicators but generated based upon time.

Subsequently, the control unit 250 of the streamer 200 creates a presentation sequence information (Cell) concerning the map and stores it in the management information area of the memory 260 as the presentation sequence information corresponding to the record (RCD) or program (PG) which has been created by a single recording operation.

The control unit 250 checks whether a request for terminating the recording mode has been received (S39). If so, the flow branches to step S31 wherein the management information (e.g., structure shown in FIG. 3 and discussed above) stored in the management information area of the memory 260 is recorded in the management information area of the recording medium 230 and the recording mode terminates. If not, the flow returns to step S35 to the aforementioned recording procedure.

Figure 5:
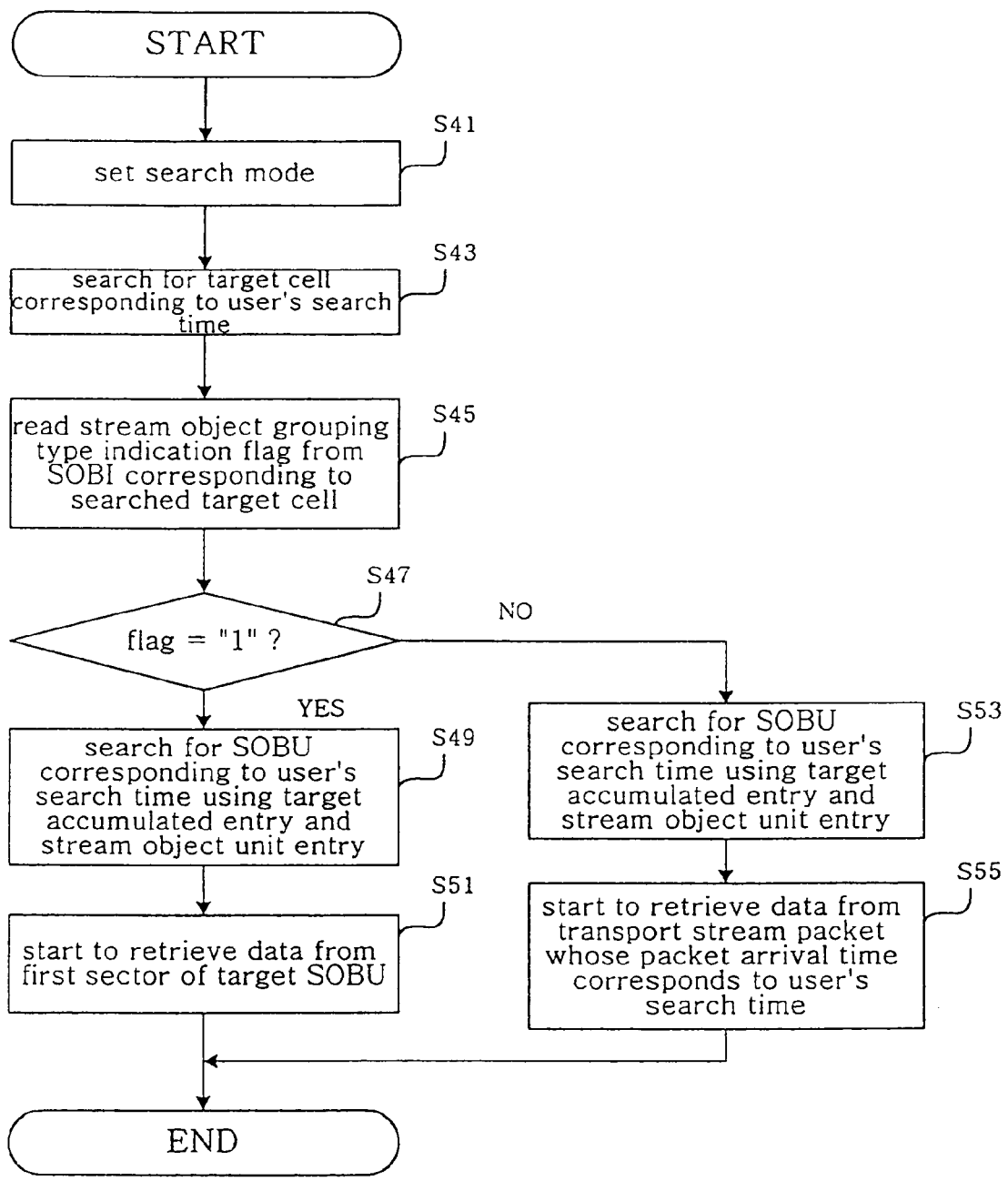
FIG. 5 is a flow diagram of the method for searching a digital data stream recorded by an embodiment of the present invention.

If a user sets a time search mode in order to search for specific data recorded on the recording medium by the above-mentioned method described with reference to FIGS. 4A and 4B, the search operation begins. A detailed explanation about the search operation will be given below with reference to FIGS. 3 and 5 according to an embodiment of the present invention.

If a user enters a search time (HH:MM:SS:FF) in order to search for a specific position on the recording medium 230 (S41), the control unit 250 of the streamer 200 looks for a record (RCD) or program (PG) corresponding to the user's search time (HH:MM:SS:FF) with reference to the creation times (PG1_Create_TM, PG2_Create_TM, PG3_Create_TM) of records (RCD1~RCD3) or programs (PG1~PG3). Suppose the detected program is PG2 shown in FIG. 3. Then, the control unit 250 looks for a Cell (Cell 2 shown in FIG. 3) corresponding to the user's search time (HH:MM:SS:FF) with reference to the presentation start time (C1_S_TM, C2_S_TM, . . . , Cn_S_TM) and presentation end time (C1_E_TM, C2_E_TM, . . . , Cn_E_TM) of each Cell contained in the detected program PG2 (S43).

Next, the control unit 250 reads stream object unit grouping type indication flag from the stream object information (SOBI) of the stream object SOB 2 corresponding to the detected Cell 2 (S45) and checks if the flag is 1 (S47). The flag value "1" indicates that stream object units constituting the stream object SOB 2 have been created based on random access indicators (S47).

If it is confirmed in step S47 that the flag is 1, the control unit 250 searches for a stream object unit (SOBUg in FIG. 3) corresponding to the user's search time as explained with reference to FIG. 3 (S49) and controls the stream reproducing unit 240 so that reproduction of recorded data begins from the packets located in the first sector (Sector 1) containing the stream object unit SOBUg and the retrieved data can be transferred to the set top box 100 through the interface such as the IEEE-1394 interface 210 (S51).

If it is confirmed in step S47 that the flag is not 1, the control unit 250 detects a target accumulated entry (ACC Entry, the entry shaded in FIG. 3) containing the accumulated presentation time (ACC_TM) which is closest to the difference between the user's search time (HH:MM:SS:FF) and the stream object start time (SOB_S_TM) with reference to the stream object information (SOBI) of the stream object SOB2 associated with the detected presentation sequence information Cell 2. Lastly, the control unit 250 detects a stream object unit (SOBU) corresponding to the stream object unit presentation time (SOBU_TM) of the stream object unit containing the user's search time (HH:MM:SS:FF) by accumulating stream object unit presentation times (SOBU_TMs) from the stream object unit pointed to by the detected accumulated entry (ACC Entry). The target stream object unit (SOBU) can be located by adding the accumulated size (ACC_SZ) of the target accumulated entry (ACC Entry) to the sum of stream object sizes (SOBU_SZs) calculated from the stream object unit pointed to by the target accumulated entry (ACC Entry) (S53).

As a next step, the control unit 250 detects the transport stream packet arrival time (TS APAT) of each transport stream packet from the first Sector 1 containing the detected stream object unit SOBUg and compares the packet arrival time with the user's search time (HH:MM:SS:FF). The control unit 250 starts to retrieve recorded data from the transport stream packet whose packet arrival time is after the user's search time and controls the stream reproducing unit 240 so that the retrieved data can be transferred to the set top box 100 through the IEEE-1394 interface 210 (S55).

The invention may be embodied in other specific forms. For example, the invention is not only applicable to the apparatus shown in FIG. 1 but applicable to any system including a subsystem functioning as a set top box, another subsystem functioning as streamer, and a communication interface between the two systems.

In the previous embodiments, the random access indicators contained in the received data stream were detected by the control unit of the streamer. It is also possible, however, for the control unit of the set top box to detect the random access indicators and transmit the detected random access indicators to the streamer through the IEEE-1394 interface. In this case, the control unit of the set top box detects random access indication information for each transport stream packet and adds a flag indicative of the existence of the random access indication information during time stamping of the associated transport stream packet. The control unit of the streamer checks the flag and determines the method for creating stream object units depending on the flag value.

According to the present invention, random access information contained in a received digital data stream is detected and stream object units are created based upon the detected random access information, which enables reproduction of recorded data to start from the transport stream packet having the random access information and prevents imperfect data reproduction after track seek or time seek operations.

Also, the received digital data stream is recorded on a recording medium by partitioning the received data stream into random-accessible minimum presentation units or presentation units of a fixed time length depending upon the existence of random access indication information, thereby not limiting the usage of the apparatus.

The invention may be embodied in other specific forms without departing from the sprit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method of recording data on a recording medium, comprising:

checking, by a recording device, for a random access indicator to determine one of a first and a second recording mode for recording a digital stream, the digital stream being grouped into a data unit, wherein the first recording mode is for recording data based on entry point information present in the digital stream and the second recording mode is for recording data based on a predetermined time length of the data unit; and recording, by the recording device, the digital stream based on the determined recording mode, and recording mode information indicating the determined recording mode.

2. The method of claim 1, wherein the recording step records the digital stream based on the first recording mode if the entry point information is detected.

3. The method of claim 2, wherein the recording step records the digital stream based on the second recording mode if the entry point information is not detected within the predetermined time, while the first recording mode is the determined mode.

4. The method of claim 1, wherein the recording step records the digital stream based on the second recording mode regardless of the detection of the entry point information.

5. The method of claim 1, wherein the recording step records the mode information as management information to control a data reproduction at a specific area of the recording medium according to the recording mode.

6. The method of claim 1,
wherein the recording step records the digital data stream while grouping data packets of the digital data stream into a stream object unit and a stream object,
wherein the stream object unit includes one or more packet groups, and the stream object includes one or more stream object units.

7. A method of recording data on a recording medium, comprising:

selecting, by a recording device, one of a first and a second recording mode for recording a digital stream, the digital stream being grouped into a data unit, wherein the step of selecting includes checking for a random access indicator to determine the one of the first and the second recording mode for recording the digital stream, and wherein the first recording mode is for recording data based on an entry point information present in the digital stream and the second recording mode is for recording data based on a predetermined time length of the data unit; and recording, by the recording device, the digital stream based on the selected recording mode, and recording mode information indicating the selected recording mode.

8. The method of claim 7, wherein the selecting step selects the second recording mode from the first recording mode for recording data packets received within the predetermined time if the first mode is selected in order to record the digital stream and the entry point information is not detected within the predetermined time.

9. A method of recording data on a recording medium, the method comprising:

determining, by a recording device, whether to record the digital stream comprising a plurality of data packets according to a first recording mode or second recording mode, the digital stream being grouped into a data unit, wherein the step of determining includes checking for a random access indicator to determine the one of the first and the second recording mode for recording the digital stream, and wherein the first recording mode is for recording the data packets based on an entry point information present in the digital stream and the second recording mode is for recording the data packets received within a predetermined time length of the data unit; and recording, by the recording device, the data packets according to the determined recording mode, and recording type information indicating the determined recording mode.

10. The method of claim 9, wherein the recording step records the mode information as management information to control a data reproduction at a specific area of the recording medium.

11. The method of claim 9, further comprising:
grouping the data packets into one or more stream object units according to the determined recording mode,
wherein the recording step records the data packets on the basis of the stream object units.

12. The method of claim 11, wherein the grouping step further groups one or more stream object units into one stream object.

13. The method of claim 11, wherein the grouping step groups the data packets received within the predetermined time into one stream object unit if the determining step determines the first recording mode, while the entry point information is not detected within the predetermined time.

14. The method of claim 11, wherein the recording step records management information including the mode information after recording the data packets, wherein the mode information is included in a stream object information as management information to manage a corresponding stream object.

15. An apparatus for recording data on a recording medium, the apparatus comprising:
a controller configured to determine whether to record the digital stream comprising a plurality of data packets according to a first recording mode or second recording mode, the digital stream being grouped into a data unit,
wherein the controller is configured to check for a random access indicator to determine the one of the first and the second recording mode for recording the digital stream, and
wherein the first recording mode is for recording the data packets based on an entry point information present in the digital stream and the second recording mode is for recording the data packets received within a predetermined time length of the data unit; and
a recording unit, coupled to the controller, configured to record the data including the data packets and mode information indicating the determined recording mode based on one of the first and second recording modes according to a control of the controller.

16. The apparatus of claim 15, wherein the controller is further configured to control the recording unit to record the mode information in a management information area to control a data reproduction at a specific position of the recording medium.

17. The apparatus of claim 15, further comprising:
a formatter configured to group the data packets into one or more stream object units according to a control of the controller,
wherein the controller is configured to control the recording unit to record the data packets on the basis of the stream object units.

18. The apparatus of claim 17, wherein the formatter is configured to group one or more stream object units into one stream object.

19. The apparatus of claim 17, wherein the controller is configured to control the formatter to group the data packets received within the predetermined time into one stream object unit if the first recording mode is determined, while the entry point information is not detected within the predetermined time.

20. The apparatus of claim 15, wherein the controller is configured to control the recording unit to record the mode information after recording the data packets based on one of the first and second recording modes.

21. A method of reproducing a digital stream recorded on a recording medium, comprising:
reading, by a reproducing device, flag from the recording medium;
determining, by the reproducing device based on the read flag, one of a first and a second reproducing mode for reproducing a digital stream previously recorded on the recording medium, the portion of the digital stream being grouped into a data unit,
wherein the first reproducing mode is for reproducing data based on entry point information present in the digital stream and a second reproducing mode is for reproducing data based on a predetermined time length of the data unit; and
reproducing, by the reproducing device, the digital stream based on the selected reproducing mode.

22. The method of claim 21, wherein the step of reading mode information from the recording information comprises:
reading the mode information from a management information area of the recording medium.

23. An apparatus for reproducing a digital stream recorded on a recording medium, the apparatus comprising:
a controller configured to
read a flag from the recording medium;
select, based on the read flag, one of a first and a second reproducing mode for reproducing a digital stream previously recorded on the recording medium, the digital stream being grouped into a data unit;
reproduce the digital stream based on the selected reproducing mode,
wherein the first reproducing mode is for reproducing data based on entry point information present in the digital stream and a second reproducing mode is for reproducing data based on a predetermined time length of the data unit; and
a reproducing unit, coupled to the controller, configured to read a data recorded on the recording medium.

24. The apparatus of claim 23, wherein the mode information is read from a management information area of the recording medium.

* * * * *